US009929436B2

(12) United States Patent
Joseph

(10) Patent No.: US 9,929,436 B2
(45) Date of Patent: Mar. 27, 2018

(54) DISPLAY DEVICE FOR TRANSPARENT GLAZING

(71) Applicant: SEKISUI CHEMICAL CO., LTD., Osaka, Osaka (JP)

(72) Inventor: Camille Joseph, Paris (FR)

(73) Assignee: SEKISUI CHEMICAL CO., LTD., Osaka (JP)

( * ) Notice: Subject to any disclaimer, the term of this patent is extended or adjusted under 35 U.S.C. 154(b) by 190 days.

(21) Appl. No.: 14/771,978

(22) PCT Filed: Feb. 27, 2014

(86) PCT No.: PCT/FR2014/050427
§ 371 (c)(1),
(2) Date: Sep. 1, 2015

(87) PCT Pub. No.: WO2014/131988
PCT Pub. Date: Sep. 4, 2014

(65) Prior Publication Data
US 2016/0011414 A1    Jan. 14, 2016

(30) Foreign Application Priority Data
Mar. 1, 2013  (FR) ..................... 13 51825

(51) Int. Cl.
G02B 27/00    (2006.01)
H01M 10/0565  (2010.01)
(Continued)

(52) U.S. Cl.
CPC ... H01M 10/0565 (2013.01); B32B 17/10036 (2013.01); B32B 17/10174 (2013.01);
(Continued)

(58) Field of Classification Search
CPC ........ B32B 17/10036; B32B 17/10669; B32B 17/10174; B32B 17/10339;
(Continued)

(56) References Cited

U.S. PATENT DOCUMENTS 7,301,695 B2 * 11/2007 Otani ..................... G02B 1/115
355/71
2002/0051294 A1 * 5/2002 Katayama ........... C03C 17/3417
359/586
(Continued)

FOREIGN PATENT DOCUMENTS

EP    2 131 227 A2    12/2009
EP    2 515 157 A1    10/2012
(Continued)

OTHER PUBLICATIONS

International Search Report dated Sep. 1, 2014 in PCT/FR2014/050427 (with English language translation).
(Continued)

Primary Examiner — Bumsuk Won
Assistant Examiner — Balram Parbadia
(74) Attorney, Agent, or Firm — Cheng Law Group, PLLC

(57) ABSTRACT

A display device comprising a radiation source and a glazing unit is disclosed. The glazing unit comprises a glazing function substrate and a coating that prevents reflection of incident monochromatic laser radiation emitted by the radiation source, which scans a portion of the gazing unit. The coating comprises a stack of two layers, namely, a first layer made of a material based on zinc oxide, tin oxide, silicon nitride, zinc tin oxide or zirconium silicon oxide; and a second layer made of a material based on a silicon oxide, in which the respective geometric thicknesses $Ep_1$ and $Ep_2$ of the layers are substantially equal to:
(Continued)

$$Ep_1 = 26 + 0.07(\theta) - 0.007(\theta)^2 \quad (1)$$

$$Ep_2 = 83 - 0.1(\theta) + 0.01(\theta)^2 \quad (2),$$

in which θ is the mean angle of orientation of incident monochromatic laser radiation to the normal to the glazing unit in the scanned portion thereof.

13 Claims, 1 Drawing Sheet

(51) Int. Cl.
| | | |
|---|---|---|
| *B32B 17/10* | (2006.01) | |
| *C03C 17/34* | (2006.01) | |
| *G02B 1/10* | (2015.01) | |
| *G02B 5/30* | (2006.01) | |
| *G02B 1/115* | (2015.01) | |
| *H01M 8/1027* | (2016.01) | |
| *H01M 8/1037* | (2016.01) | |
| *H01M 8/1072* | (2016.01) | |
| *H01M 14/00* | (2006.01) | |
| *G02B 27/01* | (2006.01) | |

(52) U.S. Cl.
CPC .. *B32B 17/10201* (2013.01); *B32B 17/10431* (2013.01); *B32B 17/10541* (2013.01); *B32B 17/10669* (2013.01); *B32B 17/10761* (2013.01); *C03C 17/3435* (2013.01); *G02B 1/10* (2013.01); *G02B 1/115* (2013.01); *G02B 5/30* (2013.01); *G02B 27/0018* (2013.01); *G02B 27/0101* (2013.01); *H01M 8/1027* (2013.01); *H01M 8/1037* (2013.01); *H01M 8/1074* (2013.01); *H01M 14/005* (2013.01); *C03C 2217/734* (2013.01); *G02B 2027/012* (2013.01); *G02B 2027/0196* (2013.01); *H01M 2300/0082* (2013.01); *H01M 2300/0085* (2013.01); *Y02P 70/56* (2015.11)

(58) Field of Classification Search
CPC ........ B32B 17/10541; B32B 2307/422; B32B 2605/006; B32B 17/10431; B32B 17/10513; G02B 27/0101; G02B 2027/012; G02B 27/0018; G02B 27/01; G02B 2027/0118; G02B 1/115; G02B 1/11; G02B 2027/0196; G02B 26/101; G02B 27/00

See application file for complete search history.

(56) References Cited

U.S. PATENT DOCUMENTS

| | | |
|---|---|---|
| 2009/0303604 A1 | 12/2009 | Martin |
| 2010/0253600 A1 | 10/2010 | Seder et al. |
| 2011/0073773 A1 | 3/2011 | Labrot et al. |
| 2012/0068083 A1 | 3/2012 | Labrot et al. |
| 2014/0232707 A1 | 8/2014 | Alschinger et al. |

FOREIGN PATENT DOCUMENTS

| | | |
|---|---|---|
| FR | 2 922 328 A1 | 4/2009 |
| JP | 2014-531610 A | 11/2014 |
| WO | WO 2009/122094 A1 | 10/2009 |
| WO | WO 2010/139889 A1 | 12/2010 |
| WO | WO 2013/029888 A1 | 3/2013 |

OTHER PUBLICATIONS

Notification of Reasons for Refusal for the Application No. 2015-559546 from Japan Patent Office dated Dec. 26, 2017.

\* cited by examiner

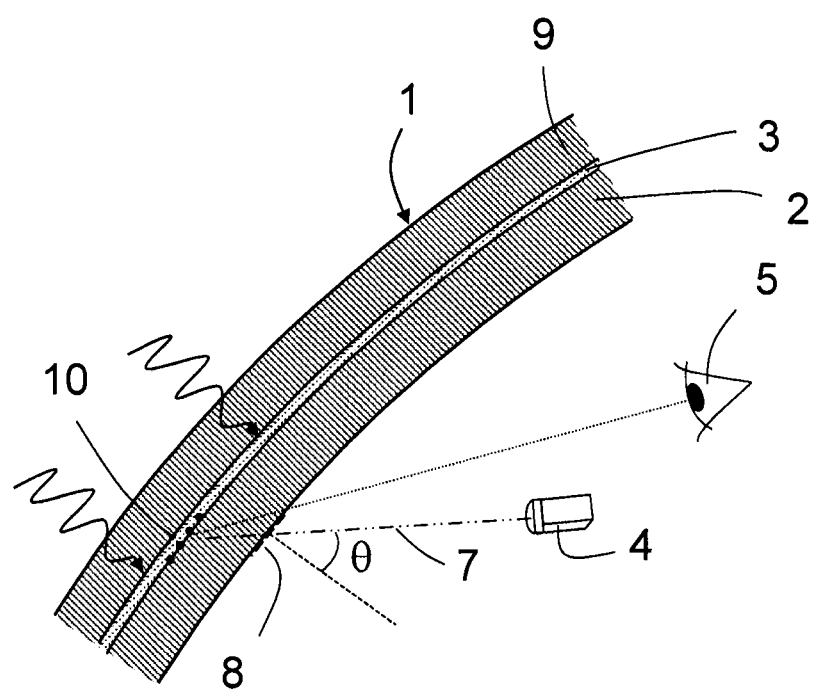

DISPLAY DEVICE FOR TRANSPARENT GLAZING

The present invention relates to the field of display systems projected onto transparent screens, particularly automobile windshields or architectural glazing units.

Most particularly, the present invention, even if it is not limited thereto, relates to the field of systems for displaying images, for example to what are called "head-up" display systems, referred to simply as HUDs (head-up displays) in the art. Such systems for displaying images are especially used in aircraft cockpits and in trains, but also nowadays in private motor vehicles (automobiles, trucks, etc.) and to display information on transparent panels (glazed shop fronts, facades, etc.). The invention in particular relates to devices for creating displays on glazing function substrates characterized in that they use a laser projector to form a real image.

In such systems, the glazing unit in general consists of a sandwich structure, comprising in the simplest case two panes of strong material, such as panes of glass. The panes of strong material are joined together by a thermoformable interlayer sheet most often comprising or consisting of polyvinyl butyral (PVB).

Head-up display systems are already known that allow information projected onto a glazing unit to be displayed, the information being reflected back toward the driver or observer. These systems in particular make it possible to inform a driver of a vehicle without him needing to turn his gaze from the field of view in front of the vehicle, thereby greatly increasing safety.

In the earliest systems, such an image was obtained by projecting information onto a windshield having a laminated structure, i.e. one formed from two glass panes and a plastic interlayer. The driver saw a virtual image located a certain distance behind the windshield. However, the driver then saw a double image, namely a first image reflected by that surface of the windshield facing the interior of the passenger compartment and a second image by reflection off the external surface of the windshield, these two images being slightly offset one with respect to the other. This offset possibly made the information harder to read. As regards solutions to this problem, mention may be made of the one proposed in U.S. Pat. No. 5,013,134 which describes a head-up display system using a laminated windshield formed from two glass panes and a polyvinyl butyral (PVB) interlayer, the two external surfaces of which windshield are not parallel but wedge-shaped, so that the image projected by a display source and reflected by that face of the windshield facing the passenger compartment is practically superimposed on the same image coming from the same source reflected by that face of the windshield facing the exterior. To eliminate the double image (a.k.a ghosting) it is conventional to produce wedge-shaped laminated glazing units using an interlayer sheet having a thickness that decreases from the top edge of the glazing unit to the bottom edge. However, it is then necessary for the PVB profile to be very regular and not to contain any thickness variations, as these are transmitted during assembly to the windshield and lead to angle variations locally. In such systems it is sought to maximize the reflection of light from the surface of the glass in order to maximize the intensity of the signal projected onto the surface of the glazing unit. Patent application EP 2 131 227, for such a type of glazing unit and with the aim of avoiding ghosting, teaches placing an antireflection coating on one of the faces of a glazing substrate of the glazing unit with the aim of preventing reflection from one of the faces and thus ghosting.

Alternatively, it is proposed in U.S. Pat. No. 6,979,499 B2 to send an incident beam, of appropriate wavelength, onto luminophores directly incorporated into the glazing unit, these being capable of responding to the excitation by emitting light radiation in the visible light range. In this way, a real image rather than a virtual image is formed directly on the windshield. This image is also visible to all the passengers of the vehicle. U.S. Pat. No. 6,979,499 B2 in particular describes laminated glazing units comprising an interlayer sheet made of polyvinyl butyral (PVB), the two external surfaces of which are parallel and in which an additional layer of luminophores is incorporated. The luminophores are chosen depending on the wavelength of the incident excitation radiation. This wavelength may be in the ultraviolet range or the IR range. The luminophores, under this incident radiation, reemit radiation in the visible range. This process is referred to as down-conversion when the incident radiation is UV radiation and up-conversion when the incident radiation is IR radiation. Such a construction makes it possible, according to said document, to reconstruct an image of any object directly on the windshield or glazing unit. According to this disclosure, luminophore materials are deposited over the entire main surface of one of the sheets constituting the laminated glazing (PVB or glass) in the form of a continuous layer comprising several types of luminophores. The sought-after image is obtained by selective excitation of a given area of the luminophore layer. The location of the image and its shape are set by means of an excitation source controlled and modulated by external means.

Experiments carried out by the Applicant have shown that with such HUD devices (i.e. with HUD devices employing luminophores integrated into assembled glazing units) the luminance obtained under conventional UV excitation sources is too low. To ensure the signal projected onto the windshield has a satisfactory luminance and is therefore sufficiently visible, especially under bright sunlight, it is necessary to use unconventional light sources, i.e. sources generating concentrated beams of radiation, such as lasers or light-emitting diodes.

Excitation sources generating concentrated and directed UV light may especially be used, said light being delivered by more specific sources such as laser diodes. The term "concentrated" is understood in the context of the present description to mean that the power per unit area, at the glazing unit, of the beam emitted by the generating source is higher than 120 $mW \cdot cm^{-2}$ and preferably comprised between 200 $mW \cdot cm^{-2}$ and 20 000 $mW \cdot cm^{-2}$, or even comprised between 500 $mW \cdot cm^{-2}$ and 10 000 $mW \cdot cm^{-2}$.

Patent application WO2010/139889 describes the use of a hydroxyterephthalate luminophore material having a high luminance, ensured by a good quantum yield under incident UV excitation, and a good durability in ageing tests under UV laser excitation. Patent application WO2009/122094 describes the application of a layer of a material known to prevent reflection of the excitation radiation used, with the aim of improving the visual contrast, under conditions of high external luminosity, of a pictogram preprinted in the glazing unit.

However, the use of such sources may be envisioned only at powers that must be kept below an upper limit, in order to prevent problems related to the dangerousness of the beam, firstly as regards the exterior of vehicle. In particular, by working with a wavelength near to 400 nm, it is possible to prevent most of the laser radiation reaching the exterior because at these wavelengths PVB strongly absorbs UV radiation.

However, the power of the incident luminous laser radiation also turns out to be very dangerous for passengers present in the passenger compartment, in particular for the driver of the vehicle, because of reflection from the glazing surfaces of the glazing unit forming the windshield. Such reflection leads to a risk of ocular lesions and of occupants of the vehicle getting burnt. This reflection, especially the specular reflection, may be relatively high (about a few percent) especially if the curvature and inclination of the windshield is taken into account.

This danger is all the more acute since the light source must emit a very powerful initial beam if the driver is to be able to see the information with enough contrast to read it very rapidly.

The present invention relates to a device allowing the safety of passengers, especially as defined in standard IEC 60825-1 (relating to the safety of laser products), to be guaranteed, and allowing, in the end, the light intensity of the incident beam reflected by the glazing function substrate to be decreased, especially by a factor of 10 or more.

In particular, it has been observed by the Applicant company that it is possible to make such a system safe by choosing a specific antireflection coating and especially by suitably choosing the constituent materials thereof and their arrangement.

Safety problems related to the use of laser sources to display images on a glazing unit, especially a windshield or a window, are very seriously limited by the method according to the present invention because it ensures these parameters are suitably chosen.

More precisely, the present invention relates to a device for displaying a real image on a glazing unit of a passenger compartment or a facade, said device comprising:

- a source of monochromatic, transverse magnetic polarized laser radiation of wavelength comprised between 380 and 410 nm and in particular between 395 and 410 nm and especially near or equal to 405 nm; and
- said glazing unit, at least one portion of which comprises a luminophore that absorbs said radiation in order to reemit light in the visible range and display the image, said radiation source (i.e. the incident beam of chromatic radiation) being oriented toward said portion of said glazing unit and scanning said portion so as to make a mean angle $\theta$ to the normal to said glazing unit.

According to the invention, the glazing unit is equipped on its face exposed to said source with an antireflection coating consisting of a stack of two layers, namely:

- a first layer the optical refractive index of which for the incident monochromatic radiation is comprised between about 1.9 and about 2.1 and preferably between 1.95 and 2.10, in particular made of a material based on zinc oxide, tin oxide, silicon nitride, a mixed zinc tin oxide ($Sn_xZn_yO$) or a mixed zirconium silicon oxide ($Si_xZr_yO$), this first layer having a thickness $Ep_1$; and
- a second layer the optical refractive index of which for the incident monochromatic radiation is comprised between 1.5 and 1.6 and is especially substantially equal to 1.54, in particular made of a material based on silicon oxide, optionally furthermore comprising carbon and/or nitrogen and/or aluminum, this second layer having a thickness $Ep_2$.

The respective geometric thicknesses $Ep_1$ and $Ep_2$ of said layers are substantially equal to:

for the first layer:

$$Ep_1 = 26 + 0.07(\theta) - 0.007(\theta)^2 \quad (1)$$

for the second layer:

$$Ep_2 = 83 - 0.1(\theta) + 0.01(\theta)^2 \quad (2).$$

In the above formulae (1) and (2), $\theta$ is in degrees (°).

The glazing unit according to the invention ideally has, on its face exposed to the incident radiation, a refractive index comprised between 1.5 and 1.6 and especially substantially equal to 1.54 for said monochromatic radiation.

In the context of the present invention, the expression "glazing unit" is understood conventionally, i.e. to mean a separating element comprising at least one glass pane or panel but also any transparent substrate able to be used to replace such glass panels and providing the same function, in particular plastic and especially polycarbonate panes. A glazing unit according to the invention, especially for an HUD application, may especially consist of a laminated glazing unit, formed by two glass panes or substrates joined by a plastic interlayer, for example a PVB interlayer.

In the context of the present invention, the expression "mean angle $\theta$" is understood to mean the mean of the angles made by the incident beam emitted by the source to the normal at each point of impact in all of the scanned zone of said glazing unit covered by the laser radiation, taking into account the curvature and inclination of said glazing unit.

In the context of the present invention, the expression "substantially equal to" is understood to mean that the thicknesses of said layers are equal or similar to the exact values obtained using the above two formulae, i.e. they are comprised in a range of between plus or minus 5 nanometers about the exact value given by formulae (1) and (2), and preferably comprised in a range of between plus or minus 4 nanometers or even in a very preferred way in a range of between plus or minus 3 nanometers about said exact value.

In the context of the present invention, the expressions "material based on" and "based on" are understood to mean that the layer essentially consists of said material, i.e. that most of said layer is made of said material (i.e. for example at least 80% by weight of said layer or even at least 90% of said layer), but that it may nonetheless comprise other materials or compounds, but in a limited amount such that its refractive index is not substantially affected by their presence or in any case remains in the aforementioned ranges. By way of example, the layers made of silicon nitride or silicon oxide according to the invention may comprise a substantial percentage of aluminum, incorporated as is known into the silicon target used initially to obtain said layer by cathode sputtering (the target then generally comprises about 8% by weight aluminum).

According to certain advantageous embodiments of the present method, which may depending on the circumstances obviously be combined together:

The source generates a laser beam at 405 nm.

The source comprises at least one laser diode.

Said glazing unit is a laminated glazing unit, used as an automotive windshield or an architectural glazing unit, comprising an assembly of at least two transparent panes of inorganic glass or of a strong organic material, connected together by an interlayer of a thermoformable material or by multilayer sheets incorporating such an interlayer, said luminophore material being integrated into said interlayer and enabling said display.

Said source of radiation is oriented toward said glazing unit so as to make a mean angle $\theta$ comprised between 0° and 50°, for example between 10 and 40°, to the normal to said glazing unit at the points of impact.

The thermoformable material forming said interlayer is chosen from the group containing PVB, plasticized PVCs, polyurethane PU and ethylene vinyl acetates EVA.

The first layer is based on silicon nitride.

The first layer is based on a mixed zinc tin oxide the Sn/Zn ratio of which is especially comprised between 50/50 and 85/15 and preferably between 55/45 and 75/25.

Said luminophore is a hydroxyalkyl terephthalate R—OOC-Φ(OH)$_x$—COOR, of structural formula:

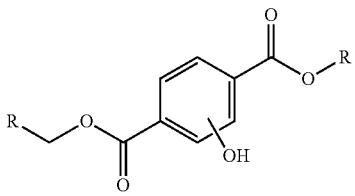

in which Φ designates a benzene core with at least one substituted hydroxy group (OH), R is a hydrocarbon chain comprising from 1 to 10 atoms and x is equal to 1 or 2, diethyl-2,5-dihydroxyterephthalate may in particular be used.

The present invention also relates to an automotive vehicle passenger compartment comprising a display device such as described above, especially a head-up display (HUD) device comprising a laminated glazing unit and a source, such as a laser, emitting a beam of concentrated directional radiation toward the portion of said glazing unit comprising said luminophore.

Lastly, the present invention relates to a method for implementing a device for displaying a real image on a glazing unit of a passenger compartment or a facade, comprising a source of monochromatic, transverse magnetic polarized laser radiation comprised between 380 and 410 nm and in particular between 395 and 410 nm, which source is oriented toward said one or more portions; and said glazing unit, at least one portion of which comprises a luminophore that absorbs said radiation in order to reemit light in the visible range and display the image, said radiation source being oriented toward said glazing unit and scanning the latter so as to make a mean angle θ to the normal to said glazing unit, in which an antireflection coating consisting of a stack of two layers is applied to that face of the glazing unit which is exposed to said source, said two layers being, starting from the glazing function substrate, in particular of optical refractive index comprised between 1.5 and 1.6 and especially substantially equal to 1.54, for the monochromatic radiation:

a first layer made of a material based on zinc oxide, tin oxide, silicon nitride, a zinc tin oxide or a zirconium silicon oxide, the optical refractive index of which for the incident monochromatic radiation is in particular comprised between about 1.9 and about 2.1 and preferably between 1.95 and 2.10, this first layer having a thickness $Ep_1$; and a second layer made of a material based on silicon oxide, optionally furthermore comprising carbon and/or nitrogen and/or aluminum, the optical refractive index of which for the incident monochromatic radiation is in particular comprised between 1.5 and 1.6 and is especially substantially equal to 1.54, this second layer having a thickness $Ep_2$, In said method, the respective geometric thicknesses $Ep_1$ and $Ep_2$ of said layers are substantially equal to:

for the first layer:

$$Ep_1=26+0.07(\theta)-0.007(\theta)^2 \qquad (1)$$

for the second layer:

$$Ep_2=83-0.1(\theta)+0.01(\theta)^2 \qquad (2).$$

The invention and its advantages will be better understood on reading the following description of an embodiment thereof, given with regard to the appended FIGURE, FIG. 1.

FIG. 1 schematically shows a windshield and a device placed in a passenger compartment of an automotive vehicle (not shown):

The windshield 1 is made up of two panes 2 and 9, typically glass panes, but they could also consist of sheets of a strong plastic such as polycarbonate. Present between the two sheets is an interlayer sheet 3 made of a plastic such as PVB (polyvinyl butyral), plasticized PVC, PU or EVA, or else a multilayer thermoplastic sheet incorporating for example PET (polyethylene terephthalate), the succession of layers in which is for example PVB/PET/PVB.

Particles of an organic luminophore of the terephthalate type according to the invention were deposited on at least one portion of the internal face of the thermoplastic interlayer sheet 3 before lamination, that is to say before the various sheets were assembled.

The luminophore particles have a size distribution predominantly between 1 and 100 microns. The term "predominantly" is understood to mean that more than 90% of the particles making up the commercial powder have a diameter between 1 and 100 microns. Preferably, the terephthalate-type luminophore particles are subjected to a prior treatment facilitating their impregnation in the thermoplastic PVB sheet. More precisely, the particles are precoated with a PVB-based binder.

A laser source 4 emitting luminous excitation radiation is used to send incident, concentrated, transverse magnetic polarized radiation 7 of wavelength equal to 405 nm toward a portion 10 of the windshield, on which portion 10 the real image must be generated. The laser source or projector for example comprises a polarizer allowing the incident beam to be polarized such that its electromagnetic field is transverse magnetic. In the context of the present invention, the expression "transverse magnetic" is understood to mean a TM:TE polarization ratio of at least 100:10 and preferably of at least 100:1 (TM: transverse magnetic; TE: transverse electric).

At least this portion 10 of the glazing unit comprises a suitable luminophore. The luminophore is advantageously a hydroterephthalate such as described in patent application WO2010/139889, for example solvated in molecular form in the thermoplastic interlayer sheet 3. The luminophore has a high coefficient of absorption of the incident radiation. The luminophore then reemits radiation in the visible range, i.e. radiation near 450 nm with an efficiency higher than 80%.

The visible radiation emitted by the luminophore is then directly observable by the eye 5 of the driver, who thus sees the object on the windshield without having to avert his eyes from the road. In this way, an image may be directly formed on a laminated windshield without it being necessary to adapt the structure of the latter, for example the thickness of the interlayer sheet, thereby enabling HUD systems to be manufactured economically.

According to the invention, the source used to generate the concentrated radiation is preferably a source of the UV laser type. For example, it is nonlimitingly a solid-state laser, a semiconductor laser diode, a gas laser, dye lasers or an excimer laser. In general, any known source generating a concentrated and directed flux, within the meaning of the present invention, of UV radiation may be used as an excitation source according to the invention. Alternatively, sources of incoherent light such as light-emitting diodes, and preferably power light-emitting diodes, emitting in the near UV range, may also be used.

According to one possible embodiment, a DLP projector according to the embodiment described in paragraph [0021] of patent application US 2005/231652 may be used to modulate the excitation wave. According to the invention, it is also possible to use as UV excitation source a device as described in patent application US2004/0232826, especially as described in connection with FIG. 3.

Using such systems makes it possible to illuminate specific portions of the glazing unit with the laser radiation, in order to make appear therein any item of information that may be useful to the driver while he is driving, especially safety- or even route-related items of information.

The above embodiment is of course in no way intended to limit any of the aspects the present invention described above.

According to the invention, the zone in question may be illuminated by a device functioning by rapidly scanning said zone with the source or by simultaneously activating pixels in said zone by means of a plurality of mirrors slaved to said source.

In particular, according to a first embodiment, a projector based on MEMS micro-mirrors will be used with a laser source. According to another embodiment, projectors based on DLP, LCD or LCOS matrices will be used with a laser or LED source. Alternatively, it is possible according to the invention to use a projector based on mirrors mounted on galvanometers reflecting a laser source.

If safety in the passenger compartment is to be guaranteed when the device is operating, the main difficulty that must be overcome is with the portion of radiation reflected by the surface of the windshield, which may be, to a first approximation, relatively large and directed toward the eyes of the passengers, especially if the inclination and curvature of the laminated windshield in the zone illuminated by the incident beam are taken into account.

According to the invention, a specific antireflection coating 8, of the type described above, is applied to the internal surface of the laminated glazing unit, i.e. to that face of the glazing unit which is turned toward the passenger compartment of the vehicle. The AR coating is applied at least in the zone of the glazing unit facing the portion 10 of the windshield comprising the luminophore material.

The following examples, based on the embodiment just described, of various types of antireflection coatings demonstrate the advantages obtained by implementing the present invention with the aim of minimizing the risks, described above, for passengers of the vehicle by substantially decreasing reflection of the beam emitted by the source from the surface of the windshield, especially for an angle of incidence comprised between 0 and 50°.

EXAMPLES

In the following examples the embodiment described above with regard to FIG. 1 was reproduced, the laminated windshield 1 comprising the luminophore being illuminated by the source or projector 4 of 405 nm, transverse magnetic polarized laser radiation, said radiation illuminating one portion 10 of the glazing unit.

The glazing unit used was a windshield comprising:
- an external first pane consisting of a tinted glass that appeared slightly green in color;
- an internal second pane consisting of the clear glass sold under the reference Planilux® by the Applicant company; and
- an interlayer of polyvinyl butyral melted between the two panes and joining the two glass panes together.

Before the laminated structure was assembled, a hydroxyterephthalate (diethyl-2,5-dihydroxyterephthalate) luminophore material was deposited on the PVB interlayer using the method indicated in patent application WO 2010/139889. The luminophore was deposited in the interlayer in a 20×10 cm rectangular portion of the glazing unit with a concentration of about $5\times10^{-4}$ g/cm$^2$.

On that part of the glazing unit which is turned toward the interior of the passenger compartment, various antireflection coatings such as indicated in the rest of the description were deposited. A glazing unit devoid of any antireflection layer on its internal surface was used as a control in order to measure the effectiveness of the protection.

Control Example

For this control glazing unit, no antireflection coating was applied to a glazing unit such as described above including the two glass panes with their interlayer. The 405 nm laser radiation was directed toward the portion of the glazing unit concentrating the luminophores, most of this 405 nm laser radiation being absorbed and converted.

That face of the glazing unit exposed to this laser radiation consisted of glass the refractive index of which was 1.54 at 405 nm. Its coefficient of reflection was about 4.5% at 405 nm.

The following examples differ from the control example in that various types of antireflection coatings were deposited on the internal face of the pane of clear Planilux® glass. The risk level R was determined, as indicated below, as a function of the initial power applied to the laser source.

Example 1

For this first glazing unit according to the invention, the antireflection stack deposited consisted of two layers, namely:
- a first layer deposited directly on the interior glass surface, said layer consisting of silicon nitride (SiN) containing a small proportion of aluminum and having a refractive index of about 2.0 for incident radiation of wavelength equal to 405 nm. The thickness of this layer was about 24 nm; and
- a second layer deposited on the silicon nitride layer, said layer consisting of silicon oxide (SiO) containing a small proportion of aluminum and having an index about equal to 1.5 at 405 nm. The thickness of this layer was 87 nm.

The two layers were deposited, before the laminated glazing unit was formed, on the appropriate face of the Planilux glass pane using conventional, well-known magnetron cathode sputtering techniques, the two layers respectively being deposited from:
- a silicon target comprising 8% by weight aluminum in a nitrogen atmosphere for the silicon nitride layer; and a silicon target comprising 8% by weight aluminum in an oxygen-containing atmosphere for the silicon oxide layer.

Example 2

For this second glazing unit according to the invention, the deposited antireflection stack consisted of two layers made of the same materials and deposited in the same way as above but with different thicknesses, in particular:
a first layer was deposited directly on the interior glass surface, said layer consisting of silicon nitride containing a small proportion of aluminum. The thickness of this layer was 12 nm; and
a second layer was deposited on the silicon nitride layer, said layer consisting of silicon oxide containing a small proportion of aluminum. The thickness of this layer was 99 nm.

Example 3

In this third glazing unit according to the invention, the deposited antireflection stack consisted of two layers made of the same materials and deposited in the same way as above but with different thicknesses, in particular:
a first layer was deposited directly on the surface, said layer consisting of silicon nitride containing a small proportion of aluminum. The thickness of this layer was 28 nm; and
a second layer was deposited on the silicon nitride layer, said layer consisting of silicon oxide containing a small proportion of aluminum. The thickness of this layer was 83 nm.

The glazing units obtained according to the above examples were then subjected to laser radiation directed toward the zone comprising the luminophore.

The projector used to illuminate the glazing unit consisted of a laser diode emitting a concentrated, monochromatic, transverse magnetic polarized beam at 405 nm. The angular aperture of the source was about 5°. The diode had an adjustable supply such that the power of the generated beam was modulatable.

The beam was oriented toward the rectangular portion of the glazing unit comprising the luminophore, such that it encountered the antireflection coating before passing through the clear glass of the first sheet.

In a first device, the average angle of incidence $\theta_1$ of the beam on the windshield was fixed and equal to 25°, taking into account the curvature and inclination of the latter.

In a second device, the average angle of incidence $\theta_2$ of the beam on the windshield was fixed and equal to 45°.

In a third device, the average angle of incidence $\theta_3$ of the beam on the windshield was fixed and equal to 0°, i.e. the incident beam was coincident with the normal to the glazing unit at the point of impact on the latter.

The dangerousness of the HUD product was quantified by a risk factor or parameter R calculated using the following procedure:

The intensity of the source was increased until the luminance of the real image formed on the windshield exceeded 3000 candelas/m² (luminance initially considered to be enough to obtain an image visible to the driver whatever the daylight conditions). The dangerousness of the beam reflected by the surface of the windshield was determined according to the principles described in standard IEC 60825-1 relating to the security of laser products. A risk factor R was determined equal to the ratio R=E/MPE, where E was the laser exposure perceived by the subject and MPE the maximum permissible exposure under the particular conditions of use of a given laser device. According to this standard, a value R equal to 1 is the acceptable limit of product dangerousness. However, it will of course, according to the invention, be sought to minimize the value of R, a value lower than 0.1 in particular being preferable, in order to obtain an optimal protection over time, or even in anticipation of tightening of said standard in the future, with a view to the dangerousness of such light sources.

By way of example, a laser projector functioning in a vector mode with a scanning speed of 900 rad/s, equipped with a laser diode having an optical power of 500 mW at 405 nm and generating a spot of 1 mm diameter, placed 1 m from the windshield, tracing a 25 cm-long outline allows a luminance of 3225 cd/m² to be achieved. Under these conditions, the maximum permissible exposure according to standard IEC 60825-1 is MPE=3.63×10⁻⁴ J/m².

Since the measured exposure is equal to E=3.57×10⁻³ J/m² for the control example, the calculated laser risk factor is then R=9.8.

To decrease the laser risk factor to an R value lower than 1 in this control case, it is thus necessary to decrease the power of the laser source to 50 mW, this having the effect of correspondingly decreasing the luminance to an unacceptable value of 323 cd/m².

The results obtained for all the tested configurations are collated in table 1 below for an obtained luminance of about 3000 cd/m²:

TABLE 1

| Glazing unit of example | Stack on the glazing unit (from the surface) | Angle of incidence of the incident radiation | Thickness calculated using formulae (1) and (2) | Risk factor |
|---|---|---|---|---|
| Control | None | 0 | — | 9.8 |
|  |  | 25 | — | 9.8 |
|  |  | 45 | — | 9.8 |
| 1 | 24 nm SiN 87 nm SiO | 0 | 26 83 | 0.4 |
|  |  | 25 | 23.375 86.75 | <0.1 |
|  |  | 45 | 14.975 98.75 | 1 |
| 2 | 12 nm SiN 99 nm SiO | 0 | 26 83 | 3.3 |
|  |  | 25 | 23.375 86.75 | 1.5 |
|  |  | 45 | 14.975 98.75 | <0.1 |
| 3 | 28 nm SiN 83 nm SiO | 0 | 26 83 | <0.1 |
|  |  | 25 | 23.375 86.75 | 0.3 |
|  |  | 45 | 14.975 98.75 | 1.6 |

The data collated in table 1 shows that the risk factor associated with the projection of incident laser radiation onto the glazing units according to examples 1 to 3 is acceptable if the thicknesses of the two layers forming the coating preventing reflection of said radiation are chosen and calibrated according to the invention depending on the angle of incidence of said radiation and by applying the preceding relationships (1) and (2). Most particularly, the results collated in table 1 show that the respective thicknesses of the two layers must be configured depending on the angle of incidence of the incident beam on the windshield, in order to limit the risk factor R, i.e. in order to ensure that passengers are safe from reflection of the incident radiation from the glazing surface.

With such an aim in mind, the glazing unit according to example 1 was tailored to an average angle of incidence $\theta_1$ of the beam on the windshield of about 25° whereas the glazing unit according to example 2 was tailored to an average angle of incidence $\theta_2$ of the beam on the windshield of about 45°. The glazing unit according to example 3 was tailored to an average angle of incidence of zero of the beam on the windshield (i.e. the normal to the glazing unit at the point of impact coincided with the direction of the incident beam).

In particular, it may be seen from the results collated in the above table that a very low risk factor, in particular lower than 0.1, may be obtained by applying the present invention, for a signal luminance of about 3000 cd/m². In certain cases of very strong illumination of the windshield, it therefore becomes in this case possible to substantially increase the luminance of the signal in order to make the items of information more visible to the driver or user, without however exceeding the risk factor R=1 defined in standard IEC 60825-1.

Such features make it safe to use very concentrated radiation sources such as lasers in vehicular (automobile, airplane, trains, etc.) HUD type applications or even to display information on windows.

The invention claimed is:

1. A device for displaying a real image on a glazing unit, said device comprising:
   a source of monochromatic, transverse magnetic polarized laser radiation of wavelength between 380 and 410 nm; and
   said glazing unit, at least one portion of which comprises a luminophore that absorbs said radiation in order to reemit light in the visible range and thereby display the image,
   wherein:
   said source of radiation is oriented toward a portion of said glazing unit in order to scan said portion so as to make a mean angle in degrees of $\theta$ to the normal to said glazing unit;
   said glazing unit is equipped on its face exposed to said source with an antireflection coating comprising a stack of two layers comprising, starting from a glazing function substrate:
   a first layer comprising a material comprising zinc oxide, tin oxide, silicon nitride, a zinc tin oxide or a zirconium silicon oxide, said first layer having a thickness in nanometers of $Ep_1$; and
   a second layer comprising a material comprising silicon oxide, and optionally furthermore comprising at least one of carbon, nitrogen, and aluminum, said second layer having a thickness in nanometers of $Ep_2$; and
   respective geometric thicknesses $Ep_1$ and $Ep_2$ of said layers are substantially equal to:
   for the first layer:
   $$Ep_1 = 26 + 0.07(\theta) - 0.007(\theta)^2 \quad (1)$$
   for the second layer:
   $$Ep_2 = 83 - 0.1(\theta) + 0.01(\theta)^2 \quad (2).$$

2. The device of claim 1, wherein the glazing unit has, on its face exposed to the incident radiation, a refractive index between 1.5 and 1.6 for said monochromatic radiation.

3. The device of claim 1, wherein, for said monochromatic radiation:
   a material of the first layer of the stack has an optical refractive index between about 1.9 and about 2.1; and
   a material of the second layer of the stack has an optical refractive index between about 1.5 and about 1.6.

4. The device of claim 1, wherein the source generates radiation at about 405 nm.

5. The device of claim 1, wherein the source comprises at least one laser diode.

6. The device of claim 1, wherein the glazing unit is a laminated glazing unit formed by joining two glass panes adhesively bonded to each other by an interlayer of a plastic, said luminophore being integrated into said interlayer.

7. The device of claim 1, wherein the material of the first layer comprises zinc oxide, tin oxide, silicon nitride or a zinc tin oxide.

8. The device of claim 1, wherein the first layer comprises silicon nitride and the second layer comprises silicon oxide.

9. The device of claim 1, wherein the first layer comprises zinc tin oxide and the second layer comprises silicon oxide.

10. The device of claim 9, wherein the material of the first layer comprises a mixed zinc silicon oxide in which a Sn/Zn ratio is between 50/50 and 85/15.

11. The device of claim 1, wherein the mean angle $\theta$ is between 0 and 50°.

12. A passenger compartment, comprising the display device of claim 1.

13. A method for implementing a device for displaying a real image on a glazing unit of a passenger compartment or a facade, the method comprising:
   a source of monochromatic, transverse magnetic polarized laser radiation between 380 and 410 nm which source is oriented toward at least one portion of said glazing unit; and
   said glazing unit, at least one portion of which comprises a luminophore that absorbs said radiation in order to reemit light in the visible range and thereby display the image,
   the method comprising orienting said radiation source toward said glazing unit and scanning the glazing unit to make a mean angle in degrees of $\theta$ to the normal to said glazing unit,
   wherein:
   an antireflection coating comprising a stack of two layers is applied to a face of the glazing unit which is exposed to said source, said two layers being, starting from a glazing function substrate:
   a first layer comprising a material comprising zinc oxide, tin oxide, silicon nitride, a zinc tin oxide or a zirconium silicon oxide, an optical refractive index of which for incident monochromatic radiation being between about 1.9 and about 2.1, this first layer having a thickness in nanometers of $Ep_1$; and
   a second layer comprising a material comprising silicon oxide, an optical refractive index of which for the incident monochromatic radiation being between 1.5 and 1.6, this second layer having a thickness in nanometers of $Ep_2$; and
   respective geometric thicknesses $Ep_1$ and $Ep_2$ of said layers are substantially equal to:
   for the first layer:
   $$Ep_1 = 26 + 0.07(\theta) - 0.007(\theta)^2 \quad (1)$$
   for the second layer:
   $$Ep_2 = 83 - 0.1(\theta) + 0.01(\theta)^2 \quad (2).$$

* * * * *